United States Patent
Kohno et al.

(10) Patent No.: US 8,214,150 B2
(45) Date of Patent: Jul. 3, 2012

(54) IN-VEHICLE APPARATUS FOR PERFORMING ROUTE GUIDANCE OR CONTENT PLAYBACK IN COOPERATION WITH A PORTABLE TERMINAL

(75) Inventors: Shigeru Kohno, Iwaki (JP); Shinji Wakabayashi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1120 days.

(21) Appl. No.: 12/100,198

(22) Filed: Apr. 9, 2008

(65) Prior Publication Data

US 2008/0300782 A1    Dec. 4, 2008

(30) Foreign Application Priority Data

May 29, 2007    (JP) .................. 2007-142356

(51) Int. Cl.
*G01C 21/34* (2006.01)
(52) U.S. Cl. ........ 701/538; 701/540; 701/444; 701/463; 701/431
(58) Field of Classification Search .................. 701/538, 701/540, 444, 463, 431
See application file for complete search history.

(56) References Cited

U.S. PATENT DOCUMENTS

| | | | |
|---|---|---|---|
| 5,546,092 A * | 8/1996 | Kurokawa et al. ....... | 342/357.52 |
| 6,993,615 B2 | 1/2006 | Falcon | |
| 7,050,591 B2 * | 5/2006 | Marumoto ...................... | 381/58 |
| 2007/0203641 A1 | 8/2007 | Dlaz et al. | |
| 2008/0010014 A1 * | 1/2008 | Hess et al. .................... | 701/211 |

FOREIGN PATENT DOCUMENTS

| | | |
|---|---|---|
| EP | 1 333 248 | 8/2003 |
| JP | 2005-207934 | 8/2005 |

OTHER PUBLICATIONS

European search report for EP 08 15 1946 dated Dec. 19, 2011, 3 pgs.

* cited by examiner

*Primary Examiner* — Ramsey Refai
(74) *Attorney, Agent, or Firm* — Brinks Hofer Gilson & Lione

(57) ABSTRACT

When an operation mode (a latest cooperation mode) immediately before removal of a portable navigation device and an operation mode (a latest independence mode) immediately before re-mounting of the portable navigation device are the same, an MPU performs processing using processing data in the latest independence mode and takes over a route-guidance operation or a content-playback operation that was independently performed by the portable navigation device. On the other hand, when the latest cooperation mode and the latest independence mode are different from each other, the MPU performs processing using processing data in the latest cooperation mode and takes over a route-guidance operation or a content-playback operation that was performed by an in-vehicle apparatus and the portable navigation device in cooperation with each other.

4 Claims, 8 Drawing Sheets

FIG. 5A

ROUTE-GUIDANCE MODE INFORMATION

| OPERATION MODE (ROUTE GUIDANCE) |
|---|
| VEHICLE-LOCATION COORDINATES |
| DESTINATION AND VIA-POINT COORDINATES |
| GUIDANCE-ROUTE INFORMATION |
| — |
| — |

FIG. 5B

AUDIO-PLAYBACK MODE INFORMATION

| OPERATION MODE (AUDIO PLAYBACK) |
|---|
| — |
| — |
| — |
| PLAYBACK TRACK NO. |
| PLAYBACK TIME POSITION |

IN-VEHICLE APPARATUS FOR PERFORMING ROUTE GUIDANCE OR CONTENT PLAYBACK IN COOPERATION WITH A PORTABLE TERMINAL

RELATED APPLICATION

The present application claims priority to Japanese Patent Application Number 2007-142356, filed May 29, 2007, the entirety of which is hereby incorporated by reference.

BACKGROUND OF THE INVENTION

1. Field of the Invention

The present invention relates to a portable terminal, an in-vehicle apparatus installed in a vehicle, and a navigation system including a portable terminal removably mounted in the in-vehicle apparatus.

2. Description of the Related Art

A navigation apparatus detects the location and orientation of a vehicle by using a GPS (global positioning system) or the like. Map data corresponding to the vehicle location is read from a map-data storage medium, such as a hard disk, CD-ROM, or DVD-ROM, on which a large amount of map data is stored. Based on the read map data, a map image of the vicinity of the vehicle location is displayed on a display device with a vehicle-location mark being superimposed on the map image. The map image is scrolled as the vehicle travels, so that a user can recognize the vehicle location.

A known navigation apparatus has a route-guidance function so that the user can drive a vehicle to a destination without getting lost. In the route-guidance function, using the map data, a guidance route having the lowest cost of a route that connects a start point to a destination is automatically searched for using a simulation calculation involving a breadth-first search method, Dijkstra method, or the like. A found route is stored as a guidance route. During travel of the vehicle, the guidance route is drawn, on a map image, in a different color from that of other roads and/or in boldface. When the vehicle approaches within a predetermined distance of an intersection where the vehicle is to change traveling direction on the guidance route, an arrow indicating the traveling direction may be displayed at the intersection, to thereby guide the driver to a destination.

There is also a known navigation apparatus that is installed in a vehicle to perform route guidance of the vehicle and that is also removable therefrom for hand-held use to perform route guidance of the user. With such a navigation apparatus that can be used after being removed from a vehicle (e.g., the technology disclosed in Japanese Patent Application Publication No. 2005-207934), when the navigation apparatus is removed from the vehicle while performing route guidance and is then re-installed in the vehicle after being used as a hand-held device, it is possible to return the operation to the route guidance operation performed before the removal.

In recent years, portable audio players are widely used, and the above-described navigation apparatus that can be used after being removed from the vehicle may also have an audio-playback function. In such a case, there is a need to appropriately switch the route-guidance operation and the audio-playback operation between the state in which the apparatus is mounted in the vehicle and the state in which the apparatus is used as a hand-held device.

SUMMARY OF THE INVENTION

In order to overcome the above-described problems, an object of the present invention is to provide a navigation system, an in-vehicle apparatus, and a portable terminal which are capable of appropriately taking over a route-guidance operation and a content-playback operation.

One embodiment of the present invention provides a navigation system including an in-vehicle apparatus installed in a vehicle and a portable terminal that is removably mounted in the in-vehicle apparatus. When the portable terminal is mounted in the in-vehicle apparatus, the in-vehicle apparatus and the portable terminal selectively perform processing in a route-guidance operation mode and processing in a content-playback operation mode in cooperation with each other, and when the portable terminal is removed from the in-vehicle apparatus, the portable terminal independently and selectively performs processing in the route-guidance operation mode and processing in the content-playback operation mode. The in-vehicle apparatus includes first storing means for storing a first operation mode before the portable terminal is removed from the in-vehicle apparatus or is disconnected from power supply and processing data in the first operation mode. In the first operation mode, the in-vehicle apparatus and the portable terminal perform processing in cooperation with each other. The portable terminal includes second storing means for storing a second operation mode before the portable terminal is re-mounted in the in-vehicle apparatus after being removed therefrom or is re-connected to the power supply after being disconnected therefrom and processing data in the second operation mode. In the second operation mode, the portable terminal independently performs processing. The in-vehicle apparatus includes: first reading means for reading the first operation mode stored in the first storing means and the second operation mode stored in the second storing means, when the portable terminal is re-mounted in the in-vehicle apparatus or is re-connected to the power supply after being disconnected therefrom; same/different-mode determining means for determining whether or not the first operation mode and the second operation mode read by the first reading means are the same; second reading means for reading the processing data in the second operation mode when the same/different-mode determining means determines that the first operation mode and the second operation mode are the same, and for reading the processing data in the first operation mode when the same/different-mode determining means determines that the first operation mode and the second operation mode are different from each other, the processing data in the second operation mode being stored in the second storing means and the processing data in the first operation mode being stored in the first storing means; and processing means for performing processing using the processing data read by the second reading means, in cooperation with the portable terminal.

With this configuration, when the first operation mode in which the in-vehicle apparatus and the portable terminal perform processing in cooperation with each other before the portable terminal is removed or is disconnected from the power supply and the second operation mode in which the portable terminal independently performs processing before the portable terminal is re-mounted in the in-vehicle apparatus after being removed therefrom or is re-connected to the power supply after being disconnected therefrom are the same, the in-vehicle apparatus performs processing using the processing data in the second operation mode and can take over the route-guidance operation or content-playback operation independently performed by the portable terminal. On the other hand, when the first operation mode and the second operation mode are different from each other, the in-vehicle apparatus performs processing using the processing data in the first operation mode and can take over the route-guidance operation or content-playback operation performed by the in-vehicle apparatus and the portable terminal in cooperation with each other.

Another embodiment of the present invention provides a navigation system including an in-vehicle apparatus installed in a vehicle and a portable terminal that is removably mounted in the in-vehicle apparatus. When the portable terminal is mounted in the in-vehicle apparatus, the in-vehicle apparatus and the portable terminal selectively perform processing in a route-guidance operation mode and processing in a content-playback operation mode in cooperation with each other, and when the portable terminal is removed from the in-vehicle apparatus, the portable terminal independently and selectively performs processing in the route-guidance operation mode and processing in the content-playback operation mode. The portable terminal includes first storing means for storing a first operation mode before the portable terminal is removed from the in-vehicle apparatus or is disconnected from a power supply and processing data in the first operation mode. In the first operation mode, the in-vehicle apparatus and the portable terminal perform processing in cooperation with each other. The portable terminal further includes second storing means for storing a second operation mode before the portable terminal is re-mounted in the in-vehicle apparatus after being removed therefrom or is re-connected to the power supply after being disconnected therefrom and processing data in the second operation mode. In the second operation mode, the portable terminal independently performs processing. The in-vehicle apparatus includes: first reading means for reading the first operation mode stored in the first storing means and the second operation mode stored in the second storing means, when the portable terminal is re-mounted in the in-vehicle apparatus or is re-connected to the power supply after being disconnected therefrom; same/different-mode determining means for determining whether or not the first operation mode and the second operation mode read by the first reading means are the same; second reading means for reading the processing data in the second operation mode when the same/different-mode determining means determines that the first operation mode and the second operation mode are different from each other, the processing data in the second operation mode being stored in the second storing means and the processing data in the first operation mode being stored in the first storing means; and processing means for performing processing using the processing data read by the second reading means, in cooperation with the portable terminal.

Another embodiment of the present invention provides an in-vehicle apparatus installed in a vehicle and a portable terminal being removably mounted in the in-vehicle apparatus. When the portable terminal is mounted in the in-vehicle apparatus, the in-vehicle apparatus selectively performs processing in a route-guidance operation mode and processing in a content-playback operation mode in cooperation with the portable terminal. The in-vehicle apparatus includes: storing means for storing a first operation mode before the portable terminal is removed from the in-vehicle apparatus or is disconnected from power supply and processing data in the first operation mode, the in-vehicle apparatus and the portable terminal performing processing in cooperation with each other in the first operation mode; and first reading means for reading the first operation mode stored in the first storing means, when the portable terminal is re-mounted in the in-vehicle apparatus after being removed therefrom or is re-connected to the power supply after being disconnected therefrom, and for reading a second operation mode before the portable terminal is re-mounted in the in-vehicle apparatus after being removed therefrom or is re-connected to the power supply after being disconnected therefrom, the second operation mode being stored in the portable terminal and the portable terminal independently performing processing in the second operation mode. The in-vehicle apparatus further includes: same/different-mode determining means for determining whether or not the first operation mode and the second operation mode read by the first reading means are the same; second reading means for reading processing data in the second operation mode before the portable terminal is remounted in the in-vehicle apparatus after being removed therefrom or is re-connected to the power supply after being disconnected therefrom when the same/different-mode determining means determines that the first operation mode and the second operation mode are the same, and for reading the processing data in the first operation mode when the same/different-mode determining means determines that the first operation mode and the second operation mode are different from each other, the processing data in the second operation mode being stored in the portable terminal and the processing data in the first operation mode being stored in the first storing means; and processing means for performing processing using the processing data read by the second reading means, in cooperation with the portable terminal.

With this configuration, when the first operation mode in which the in-vehicle apparatus and the portable terminal perform processing in cooperation with each other before the portable terminal is removed or is disconnected from the power supply and the second operation mode in which the portable terminal independently performs processing before the portable terminal is re-mounted in the in-vehicle apparatus after being removed therefrom or is re-connected to the power supply after being disconnected therefrom are the same, the in-vehicle apparatus performs processing using the processing data in the second operation mode and can take over the route-guidance operation or content-playback operation independently performed by the portable terminal. On the other hand, when the first operation mode and the second operation mode are different from each other, the in-vehicle apparatus performs processing using the processing data in the first operation mode and can take over the route-guidance operation or content-playback operation performed by the in-vehicle apparatus and the portable terminal in cooperation with each other.

Still another embodiment of the present invention provides an in-vehicle apparatus installed in a vehicle and a portable terminal being removably mounted in the in-vehicle apparatus. When the portable terminal is mounted in the in-vehicle apparatus, the in-vehicle apparatus selectively performs processing in a route-guidance operation mode and processing in a content-playback operation mode in cooperation with the portable terminal. The in-vehicle apparatus includes: first reading means for reading a first operation mode in which the in-vehicle apparatus and the portable terminal perform processing in cooperation with each other before the portable terminal is removed from the in-vehicle apparatus or is disconnected from power supply and a second operation mode in which the portable terminal independently performs processing before the portable terminal is re-mounted in the in-vehicle apparatus after being removed therefrom or is re-connected to the power supply after being disconnected therefrom, the first operation mode and the second operation mode being stored by the portable terminal; and same/different-mode determining means for determining whether or not the first operation mode and the second operation mode read by the first reading means are the same. The in-vehicle apparatus further includes second reading means for reading processing data in the second operation mode when the same/different-mode determining means determines that the first operation mode and the second operation mode are the same, and for reading processing data in the first operation mode when the same/different-mode determining means determines that the first operation mode and the second operation mode are different from each other, the processing data in the second operation mode and the processing data in the first operation mode being stored in the portable terminal; and processing means for performing processing using the processing data read by the second reading means, in cooperation with the portable terminal.

In the in-vehicle apparatus according to the present invention, the processing means may include: operation-mode determining means for determining whether or not the second operation mode is the route-guidance operation mode when the same/different-mode determining means determines that the first operation mode and the second operation mode are the same, and for determining whether or not the first operation mode is the route-guidance operation mode when the same/different-mode determining means determines that the first operation mode and the second operation mode are different from each other; and route guiding means for performing, when the same/different-mode determining means determines that the first operation mode and the second operation mode are the same and the operation-mode determining means determines that the second operation mode is the route-guidance operation mode, route guidance based on processing data in the route-guidance operation mode, the processing data being read by the second reading means and being the processing data in the second operation mode, and performing, when the same/different-mode determining means determines that the first operation mode and the second operation mode are different from each other and the operation-mode determining means determines that the first operation mode is the route-guidance operation mode, route guidance based on processing data in the route-guidance operation mode, the processing data being read by the second reading means and being the processing data in the first operation mode. The processing means may further include content playback means for performing, when the same/different-mode determining means determines that the first operation mode and the second operation mode are the same and the operation-mode determining means determines that the second operation mode is the content-playback operation mode, content playback based on processing data in the content-playback operation mode, the processing data being read by the second reading means and being the processing data in the second operation mode, and performing, when the same/different-mode determining means determines that the first operation mode and the second operation mode are different from each other and the operation-mode determining means determines that the first operation mode is the content-playback operation mode, content playback based on processing data in the content-playback operation mode, the processing data being read by the second reading means and being the processing data in the first operation mode.

In the in-vehicle apparatus according to the present invention, the processing data in the route-guidance operation mode may include a destination location and guidance-route information. The route guiding means may include: vehicle-location obtaining means for obtaining a location of the vehicle; and route searching means for searching for, when the vehicle location obtained by the vehicle-location obtaining means is at a predetermined distance or more away from a guidance route identified by the guidance-route information, a guidance route from the vehicle location to the destination location, and for searching for, when the destination location is different from a destination location in immediately preceding route guidance, a guidance route from the vehicle location to the changed destination location.

With this configuration, the in-vehicle apparatus can take over the route-guidance operation in processing performed by the in-vehicle apparatus and the portable terminal in cooperation with each other before the portable terminal is removed or is disconnected from the power supply, or the route-guidance operation in processing independently performed by the portable terminal before the portable terminal is re-mounted in the in-vehicle apparatus after being disconnected therefrom or is re-connected to the power supply after being disconnected therefrom. When the vehicle location is at a predetermined distance or more away from a guidance route, the in-vehicle apparatus searches for a guidance route from the vehicle location to a destination location, and when the vehicle location is different from a destination location in immediately preceding route guidance, the in-vehicle apparatus searches for a guidance route from the vehicle location to the changed destination location, thereby making it possible to appropriately take over the route-guidance operation.

The processing data in the content-playback operation mode may include playback-position information of content, and the content-playback means may resume playback of the content from a playback position specified by the playback-position information.

With this configuration, since the in-vehicle apparatus resumes playback of content from the playback position specified by the playback-position information, it can take over the content-playback operation in processing performed by the in-vehicle apparatus and the portable terminal in cooperation with each other before the portable terminal is removed or is disconnected from the power supply, or the content-playback operation in processing independently performed by the portable terminal before the portable terminal is re-mounted in the in-vehicle apparatus after being disconnected therefrom or is re-connected to the power supply after being disconnected therefrom.

Another embodiment of the present invention provides a portable terminal that is removably mounted in an in-vehicle apparatus installed in a vehicle. When the portable terminal is mounted in the in-vehicle apparatus, the portable terminal selectively performs processing in a route-guidance operation mode and processing in a content-playback operation mode in cooperation with the in-vehicle apparatus, and when the portable terminal is removed from the in-vehicle apparatus, the portable terminal independently and selectively performs processing in the route-guidance operation mode and processing in the content-playback operation mode. The portable terminal includes: storing means for storing an operation mode in which the portable terminal independently performs processing before the portable terminal is re-mounted in the in-vehicle apparatus after being removed therefrom or is re-connected to the power supply after being disconnected therefrom and processing data in the operation mode; and transmitting means for transmitting the operation mode and the processing mode in the operation mode to the in-vehicle apparatus, the operation mode and the processing mode being stored by the storing means.

With this arrangement, the portable terminal transmits the operation mode and the processing data in the operation mode to the in-vehicle apparatus, the portable terminal independently performing processing before the portable terminal is re-mounted in the in-vehicle apparatus after being removed therefrom or is re-connected to the power supply after being disconnected therefrom in the operation mode. Thus, the in-vehicle apparatus can take over the operation in the processing independently performed by the portable terminal before the portable terminal is re-mounted in the in-vehicle apparatus after being removed therefrom or is re-connected to the power supply after being disconnected therefrom.

Yet another embodiment of the present invention provides a portable terminal that is removably mounted in an in-vehicle apparatus installed in a vehicle. When the portable terminal is mounted in the in-vehicle apparatus, the portable terminal selectively performs processing in a route-guidance operation mode and processing in a content-playback operation mode in cooperation with the in-vehicle apparatus, and when the portable terminal is removed from the in-vehicle apparatus, the portable terminal independently and selectively performs processing in the route-guidance operation mode and processing in the content-playback operation mode. The portable terminal includes first storing means for storing a first operation mode before the portable terminal is removed from the in-vehicle apparatus or is disconnected from power supply and processing data in the first operation mode. In the first operation mode, the in-vehicle apparatus and the portable terminal perform processing in cooperation with each other. The portable terminal further includes second storing means for storing a second operation mode before the portable terminal is re-mounted in the in-vehicle apparatus after being removed therefrom or is re-connected to the power supply after being disconnected therefrom and processing data in the second operation mode. In the second operation mode, the portable terminal independently performs processing. The portable terminal further includes transmitting means for transmitting the first operation mode, the processing data in the first operation mode, the second operation mode, and the processing data in the second operation mode to the in-vehicle apparatus, the first operation mode and the processing data in the first operation mode being stored by the first storing means and the second operation mode and the processing data in the second operation mode being stored by the second storing means.

With this arrangement, the portable terminal transmits, to the in-vehicle apparatus, the operation mode in processing performed by the in-vehicle apparatus and the portable terminal in cooperation with each other before the portable terminal is removed from the in-vehicle apparatus or is disconnected from the power supply and the processing data in the operation mode. The portable terminal also transmits, to the in-vehicle apparatus, the operation mode in processing independently performed by the portable terminal before the portable terminal is re-mounted in the in-vehicle apparatus after being removed therefrom or is re-connected to the power supply after being disconnected therefrom. Thus, the in-vehicle apparatus can take over the operation in the processing performed by the in-vehicle apparatus and the portable terminal in cooperation with each other before the portable terminal is removed from the in-vehicle apparatus or is disconnected from the power supply, and the operation in the processing independently performed by the portable terminal before the portable terminal is re-mounted in the in-vehicle apparatus after being removed therefrom or is re-connected to the power supply after being disconnected therefrom.

Yet another embodiment of the present invention provides a portable terminal that is removably mounted in an in-vehicle apparatus installed in a vehicle. When the portable terminal is mounted in the in-vehicle apparatus, the portable terminal selectively performs processing in a route-guidance operation mode and processing in a content-playback operation mode in cooperation with the in-vehicle apparatus, and when the portable terminal is removed from the in-vehicle apparatus, the portable terminal independently and selectively performs processing in the route-guidance operation mode and processing in the content-playback operation mode. The portable terminal includes: first storing means for storing a first operation mode before the portable terminal is removed from the in-vehicle apparatus or is disconnected from power supply and processing data in the first operation mode, the in-vehicle apparatus and the portable terminal performing processing in cooperation with each other in the first operation mode; and second storing means for storing a second operation mode before the portable terminal is re-mounted in the in-vehicle apparatus after being removed therefrom or is re-connected to the power supply after being disconnected therefrom and processing data in the second operation mode, the portable terminal independently performing processing in the second operation mode. The portable terminal further includes: first reading means for reading the first operation mode stored in the first storing means and the second operation mode stored in the second storing means, when the portable terminal is re-mounted in the in-vehicle apparatus after being removed therefrom or is re-connected to the power supply after being disconnected therefrom; same/different-mode determining means for determining whether or not the first operation mode and the second operation mode read by the first reading means are the same; second reading means for reading the processing data in the second operation mode when the same/different-mode determining means determines that the first operation mode and the second operation mode are the same, and for reading the processing data in the first operation mode when the same/different-mode determining means determines that the first operation mode and the second operation mode are different from each other, the processing data in the second operation mode being stored in the second storing means and the processing data in the first operation mode being stored in the first storing means; and processing means for performing processing using the processing data read by the second reading means, in cooperation with the in-vehicle apparatus.

With this configuration, when the first operation mode in which the in-vehicle apparatus and the portable terminal perform processing in cooperation with each other before the portable terminal is removed or is disconnected from the power supply and the second operation mode in which the portable terminal independently performs processing before the portable terminal is re-mounted in the in-vehicle apparatus after being removed therefrom or is re-connected to the power supply after being disconnected therefrom are the same, the portable terminal performs processing using the processing data in the second operation mode and can take over the route-guidance operation or content-playback operation independently performed by the portable terminal. On the other hand, when the first operation mode and the second operation mode are different from each other, the portable terminal performs processing using the processing data in the first operation mode and can take over the route-guidance operation or content-playback operation performed by the in-vehicle apparatus and the portable terminal in cooperation with each other.

In the portable terminal according to the present invention, the processing means may include: operation-mode determining means for determining whether or not the second operation mode is the route-guidance operation mode, when the same/different-mode determining means determines that the first operation mode and the second operation mode are the same, and for determining whether or not the first operation mode is the route-guidance operation mode, when the same/different-mode determining means determines that the first operation mode and the second operation mode are different from each other. The processing means may further include: route guiding means for performing, when the same/different-mode determining means determines that the first operation mode and the second operation mode are the same and the operation-mode determining means determines that the second operation mode is the route-guidance operation mode, route guidance based on processing data in the route-guidance operation mode, the processing data being read by the second reading means and being the processing data in the second operation mode, and performing, when the same/different-mode determining means determines that the first operation mode and the second operation mode are different from each other and the operation-mode determining means determines that the first operation mode is the route-guidance operation mode, route guidance based on processing data in the route-guidance operation mode, the processing data being read by the second reading means and being the processing data in the first operation mode; and content playback means for performing, when the same/different-mode determining means determines that the first operation mode and the second operation mode are the same and the operation-mode determining means determines that the second operation mode is the content-playback operation mode, content playback based on processing data in the content-playback operation mode, the processing data being read by the second reading means and being the processing data in the second operation mode, and performing, when the same/different-mode determining means determines that the first operation mode and the second operation mode are different from each other and the operation-mode determining means determines that the first operation mode is the content-playback operation mode, content playback based on processing data in the content-playback operation mode, the processing data being read by the second reading means and being the processing data in the first operation mode.

In the portable terminal according to the present invention, the processing data in the route-guidance operation mode may include a destination location and guidance-route information. The route guiding means may include: vehicle-location obtaining means for obtaining a location of the vehicle; and route searching means for searching for, when the vehicle location obtained by the vehicle-location obtaining means is at a predetermined distance or more away from a guidance route identified by the guidance-route information, a guidance route from the vehicle location to the destination location, and for searching for, when the destination location is different from a destination location in immediately preceding route guidance, a guidance route from the vehicle location to the changed destination location.

With this configuration, the portable terminal can take over the route-guidance operation in processing performed by the in-vehicle apparatus and the portable terminal in cooperation with each other before the portable terminal is removed or is disconnected from the power supply, or the route-guidance operation in processing independently performed by the portable terminal before the portable terminal is re-mounted in the in-vehicle apparatus after being disconnected therefrom or is re-connected to the power supply after being disconnected therefrom. When the vehicle location is at a predetermined distance or more away from a guidance route, the in-vehicle apparatus searches for a guidance route from the vehicle location to a destination location, and when the vehicle location is different from a destination location in immediately preceding route guidance, the portable terminal searches for a guidance route from the vehicle location to the changed destination location, thereby making it possible to appropriately take over the route-guidance operation.

In the portable terminal according to the present invention, the processing data in the content-playback operation mode may include playback-position information of content, and the content-playback means may resume playback of the content from a playback position specified by the playback-position information.

With this configuration, since the portable terminal resumes playback of content from the playback position specified by the playback-position information, it can take over the content-playback operation in processing performed by the in-vehicle apparatus and the portable terminal in cooperation with each other before the portable terminal is removed or is disconnected from the power supply, or the content-playback operation in processing independently performed by the portable terminal before the portable terminal is re-mounted in the in-vehicle apparatus after being disconnected therefrom or is re-connected to the power supply after being disconnected therefrom.

Still another embodiment of the present invention provides a processing method for an in-vehicle apparatus installed in a vehicle and a portable terminal being removably mounted in the in-vehicle apparatus. When the portable terminal is mounted in the in-vehicle apparatus, the in-vehicle apparatus selectively performs processing in a route-guidance operation mode and processing in a content-playback operation mode in cooperation with the portable terminal. The processing method includes: a first storing step of storing, in storing means, a first operation mode before the portable terminal is removed from the in-vehicle apparatus or is disconnected from power supply and processing data in the first operation mode, the in-vehicle apparatus and the portable terminal performing processing in cooperation with each other in the first operation mode; a first reading step of reading the first operation mode stored in the storing means when the portable terminal is re-mounted in the in-vehicle apparatus after being removed therefrom or is re-connected to the power supply after being disconnected therefrom, and of reading a second operation mode before the portable terminal is re-mounted in the in-vehicle apparatus after being removed therefrom or is re-connected to the power supply after being disconnected therefrom, the second operation mode being stored in the portable terminal and the portable terminal independently performing processing in the second operation mode. The processing method further includes a same/different-mode determining step of determining whether or not the first operation mode and the second operation mode read in the first reading step are the same; a second reading step of reading processing data in the second operation mode before the portable terminal is re-mounted in the in-vehicle apparatus after being removed therefrom or is re-connected to the power supply after being disconnected therefrom when it is determined in the same/different-mode determining step that the first operation mode and the second operation mode are the same, and of reading the processing data in the first operation mode when it is determined in the same/different-mode determining step that the first operation mode and the second operation mode are different from each other, the processing data in the second operation mode being stored in the portable terminal and the processing data in the first operation mode being stored in the storing means; and a processing step of performing processing using the processing data read in the second reading step, in cooperation with the portable terminal.

A further embodiment of the present invention provides a processing method for an in-vehicle apparatus installed in a vehicle and a portable terminal being removably mounted in the in-vehicle apparatus. When the portable terminal is mounted in the in-vehicle apparatus, the in-vehicle apparatus selectively performs processing in a route-guidance operation mode and processing in a content-playback operation mode in cooperation with the portable terminal. The processing method includes: a first reading step of reading a first operation mode in which the in-vehicle apparatus and the portable terminal perform processing in cooperation with each other before the portable terminal is removed from the in-vehicle apparatus or is disconnected from power supply and a second operation mode in which the portable terminal independently performs processing before the portable terminal is re-mounted in the in-vehicle apparatus after being removed therefrom or is re-connected to the power supply after being disconnected therefrom, the first operation mode and the second operation mode being stored by the portable terminal; and a same/different-mode determining step of determining whether or not the first operation mode and the second operation mode read in the first reading step are the same. The processing method further includes a second reading step of reading processing data in the second operation mode when it is determined in the same/different-mode determining step that the first operation mode and the second operation mode are the same, and for reading processing data in the first operation mode when it is determined in the same/different-mode determining step that the first operation mode and the second operation mode are different from each other, the processing data in the second operation mode and the processing data in the first operation mode being stored in the portable terminal; and a processing step of performing processing using the processing data read in the second reading step, in cooperation with the portable terminal.

Another embodiment of the present invention provides a processing method for a portable terminal that is removably mounted in an in-vehicle apparatus installed in a vehicle. When the portable terminal is mounted in the in-vehicle apparatus, the portable terminal selectively performs processing in a route-guidance operation mode and processing in a content-playback operation mode in cooperation with the in-vehicle apparatus, and when the portable terminal is removed from the in-vehicle apparatus, the portable terminal independently and selectively performs processing in the route-guidance operation mode and processing in the content-playback operation mode. The processing method includes: a storing step of storing, in storing means, an operation mode in which the portable terminal independently performs processing before the portable terminal is re-mounted in the in-vehicle apparatus after being removed therefrom or is re-connected to a power supply after being disconnected therefrom and processing data in the operation mode; and a transmitting step of transmitting the operation mode and the processing mode in the operation mode to the in-vehicle apparatus, the operation mode and the processing mode being stored in the storing means.

Still another embodiment of the present invention provides a processing method for a portable terminal that is removably mounted in an in-vehicle apparatus installed in a vehicle. When the portable terminal is mounted in the in-vehicle apparatus, the portable terminal selectively performs processing in a route-guidance operation mode and processing in a content-playback operation mode in cooperation with the in-vehicle apparatus, and when the portable terminal is removed from the in-vehicle apparatus, the portable terminal independently and selectively performs processing in the route-guidance operation mode and processing in the content-playback operation mode. The processing method includes: a first storing step of storing, in storing means, a first operation mode before the portable terminal is removed from the in-vehicle apparatus or is disconnected from a power supply and processing data in the first operation mode, the in-vehicle apparatus and the portable terminal performing processing in cooperation with each other in the first operation mode; a second storing step of storing, in the storing means, a second operation mode before the portable terminal is re-mounted in the in-vehicle apparatus after being removed therefrom or is re-connected to the power supply after being disconnected therefrom and processing data in the second operation mode, the portable terminal independently performing processing in the second operation mode; and a transmitting step of transmitting the first operation mode, the processing mode in the first operation mode, the second operation mode, and the processing data in the second operation mode, which are stored in the storing means, to the in-vehicle apparatus in response to reading performed by the in-vehicle apparatus.

Yet another embodiment of the present invention provides a processing method for a portable terminal that is removably mounted in an in-vehicle apparatus installed in a vehicle. When the portable terminal is mounted in the in-vehicle apparatus, the portable terminal selectively performs processing in a route-guidance operation mode and processing in a content-playback operation mode in cooperation with the in-vehicle apparatus, and when the portable terminal is removed from the in-vehicle apparatus, the portable terminal independently and selectively performs processing in the route-guidance operation mode and processing in the content-playback operation mode. The processing method includes: a first storing step of storing, in storing means, a first operation mode before the portable terminal is removed from the in-vehicle apparatus or is disconnected from a power supply and processing data in the first operation mode, the in-vehicle apparatus and the portable terminal performing processing in cooperation with each other in the first operation mode; a second storing step of storing, in the storing means, a second operation mode before the portable terminal is re-mounted in the in-vehicle apparatus after being removed therefrom or is re-connected to the power supply after being disconnected therefrom and processing data in the second operation mode, the portable terminal independently performing processing in the second operation mode; and a first reading step of reading the first operation mode stored in the storing means and the second operation stored in the storing means, when the portable terminal is re-mounted in the in-vehicle apparatus after being removed therefrom or is re-connected to the power supply after being disconnected therefrom. The processing method further includes a same/different-mode determining step of determining whether or not the first operation mode and the second operation mode read in the first reading step are the same; a second reading step of reading the processing data in the second operation mode when it is determined in the same/different-mode determining step that the first operation mode and the second operation mode are the same, and of reading the processing data in the first operation mode when it is determined in the same/different-mode determining step that the first operation mode and the second operation mode are different from each other, the processing data in the second operation mode and the processing data in the first operation mode being stored in the storing means; and a processing step of performing processing using the processing data read in the second reading step, in cooperation with the in-vehicle apparatus.

According to the present invention, when the first operation mode in which the in-vehicle apparatus and the portable terminal perform processing in cooperation with each other before the portable terminal is removed or is disconnected from the power supply and the second operation mode in which the portable terminal independently performs processing before the portable terminal is re-mounted in the in-vehicle apparatus after being removed therefrom or is re-connected to the power supply after being disconnected therefrom are the same, processing using the processing data in the second operation mode is performed to appropriately take over the route-guidance operation or content-playback operation independently performed by the portable terminal. On the other hand, when the first operation mode and the second operation mode are different from each other, processing using the processing data in the first operation mode is performed to appropriately take over the route-guidance operation or content-playback operation performed by the in-vehicle apparatus and the portable terminal in cooperation with each other.

BRIEF DESCRIPTION OF THE DRAWINGS

FIG. 5A is a table showing one example of route-guidance mode information;

FIG. 5B is a table showing one example of audio-playback mode information;

DETAILED DESCRIPTION OF THE PREFERRED EMBODIMENTS

Figure 1A:
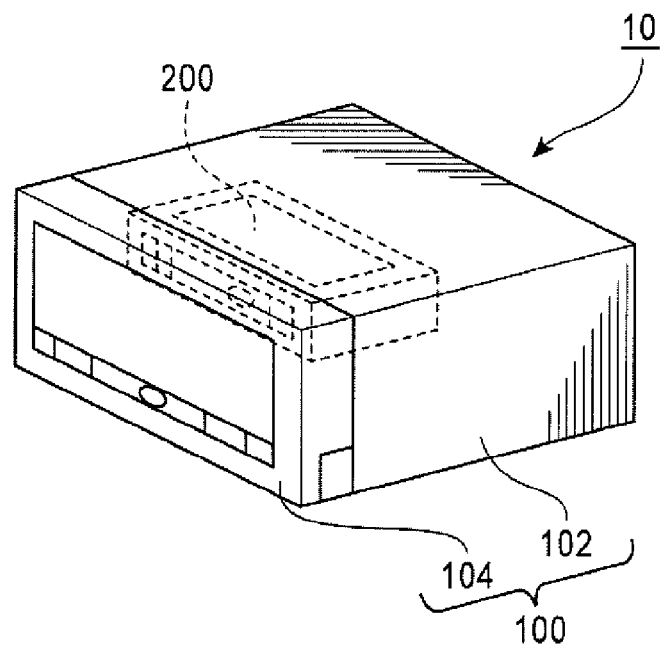
FIG. 1A is an exterior perspective view of a navigation system when a portable navigation device (PND) is mounted in an in-vehicle audio apparatus.
Figure 1B:
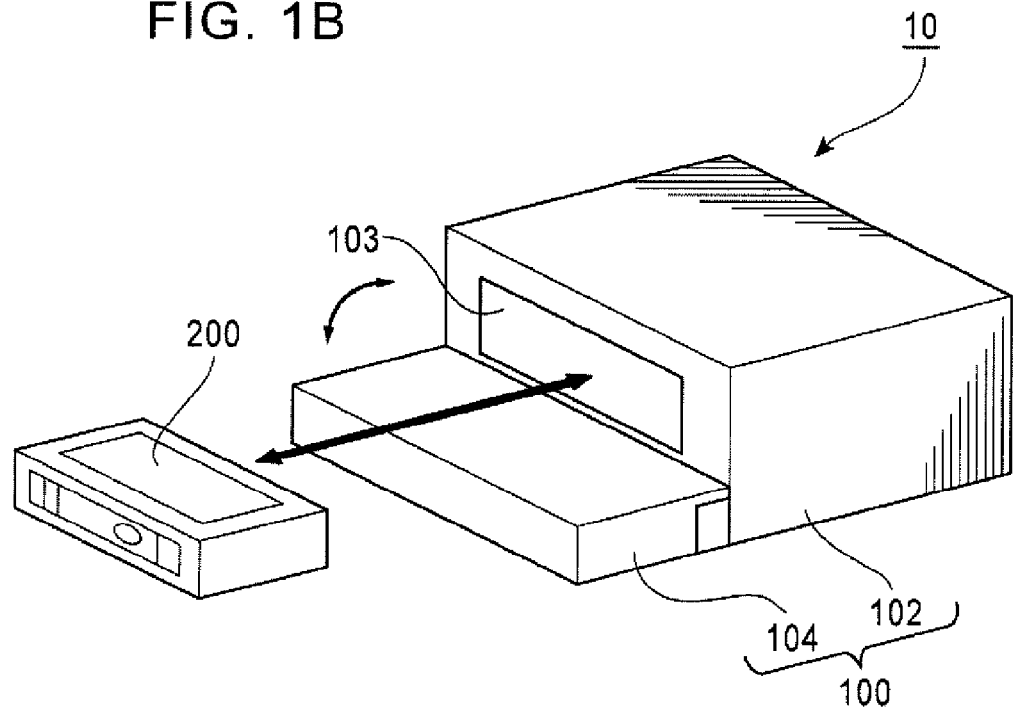
FIG. 1B is an exterior perspective view of the navigation system when the PND is removed from the in-vehicle audio apparatus.

An embodiment of the present invention will be described below in detail with reference to the accompanying drawings. FIGS. 1A and 1B are exterior perspective views of a navigation system according to the present invention. In FIGS. 1A and 1B, a navigation system 10 includes an in-vehicle audio apparatus 100 and a portable navigation device (PND) 200. The in-vehicle audio apparatus 100 is installed in a vehicle and has a main unit 102 and a front section 104, and the PND 200 is removably mounted in the in-vehicle audio apparatus 100.

FIG. 1A shows a state in which the PND 200 is mounted in the in-vehicle audio apparatus 100. On the other hand, as shown in FIG. 1B, pivoting the front section 104 about a lower edge thereof causes a front face of the main unit 102 to be exposed, so that the PND 200 can be removed from a mounting slot 103 provided in the front face. In addition, inserting the PND 200 into the main unit 102 through the mounting slot 103 allows the PND 200 to be re-mounted in the in-vehicle audio apparatus 100.

When the PND 200 is mounted in the in-vehicle audio apparatus 100 of the navigation system 10, the in-vehicle audio apparatus 100 and the PND 200 selectively perform processing in a route-guidance operation mode and processing in an audio-playback operation mode in cooperation with each other. When a user uses the PND 200 as a hand-held device after removing it from the in-vehicle audio apparatus 100, the PND 200 independently and selectively performs processing in the route-guidance operation mode and processing in the audio-playback operation mode.

Figure 2:
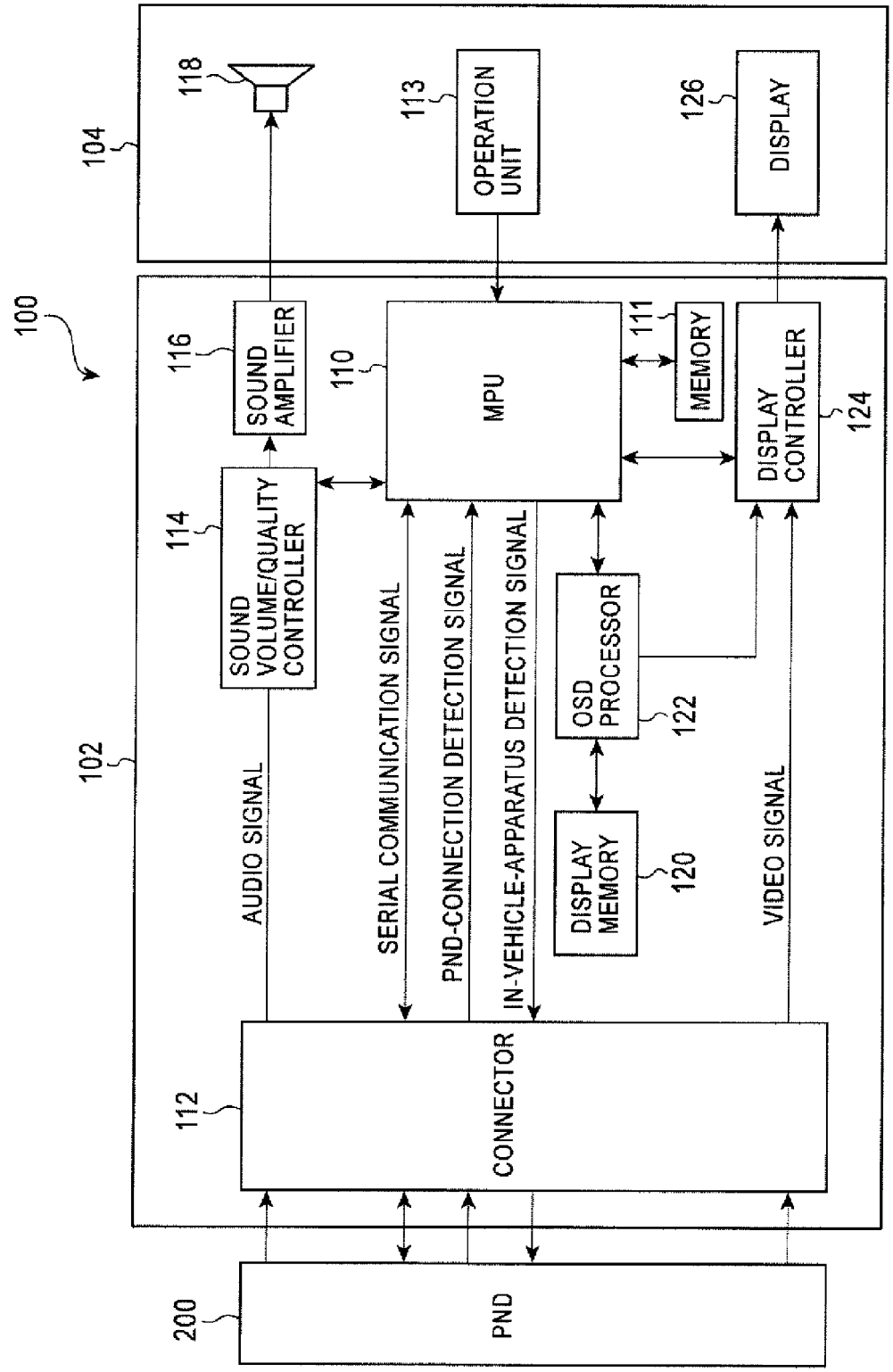
FIG. 2 is a block diagram showing a configuration of the in-vehicle audio apparatus.

FIG. 2 is a block diagram of the configuration of the in-vehicle audio apparatus 100. In FIG. 2, the main unit 102 of the in-vehicle audio apparatus 100 includes a microcomputer (MPU) 110, a memory 111, a connector 112, a sound volume/quality controller 114, a sound amplifier 116, a display memory 120, an OSD (on-screen display) processor 122, and a display controller 124. The front section 104 of the in-vehicle audio apparatus 100 includes an operation unit 113, a speaker 118, and a display 126.

The MPU 110 controls the entire in-vehicle audio apparatus 100 during route-guidance operation and audio-playback operation. The MPU 110 corresponds to first reading means, second reading means, same/different-mode determining means, and processing means in certain claims, and also corresponds to operation-mode determining means, route guiding means, and content playback means in certain claims. The memory 111 stores various types of information needed for the route-guidance operation and the audio-playback operation. The memory 111 corresponds to storing means in certain claims.

The PND 200 may be connected to the connector 112, through which a serial communication signal, a PND-connection detection signal, an in-vehicle-apparatus detection signal, a video signal, and an audio signal are communicated between the in-vehicle audio apparatus 100 and the PND 200.

The operation unit 113 is, for example, a touch panel and is operated by the user. The MPU 110 performs various types of control in accordance with a user operation. Under the control of the MPU 110, the sound volume/quality controller 114 sets the sound volume and sound quality of an audio signal sent from the MPU 110 and an audio signal sent from the PND 200 via the connector 112, and outputs the resulting audio signal. The sound amplifier 116 amplifies the audio signal supplied from the sound volume/quality controller 114, and the speaker 118 outputs sound.

The display memory 120 stores various image data, such as data for a menu screen. Under the control of the MPU 110, the OSD processor 122 generates an image corresponding to image data stored in the display memory 120 and outputs a video signal to the display controller 124. Under the control of the MPU 110, the display controller 124 receives the video signals from the MPU 110 and the OSD processor 122 and also receives a video signal from the PND 200 via the connector 112, performs image synthesis and so on as needed, and displays an image on the display 126.

Figure 3:
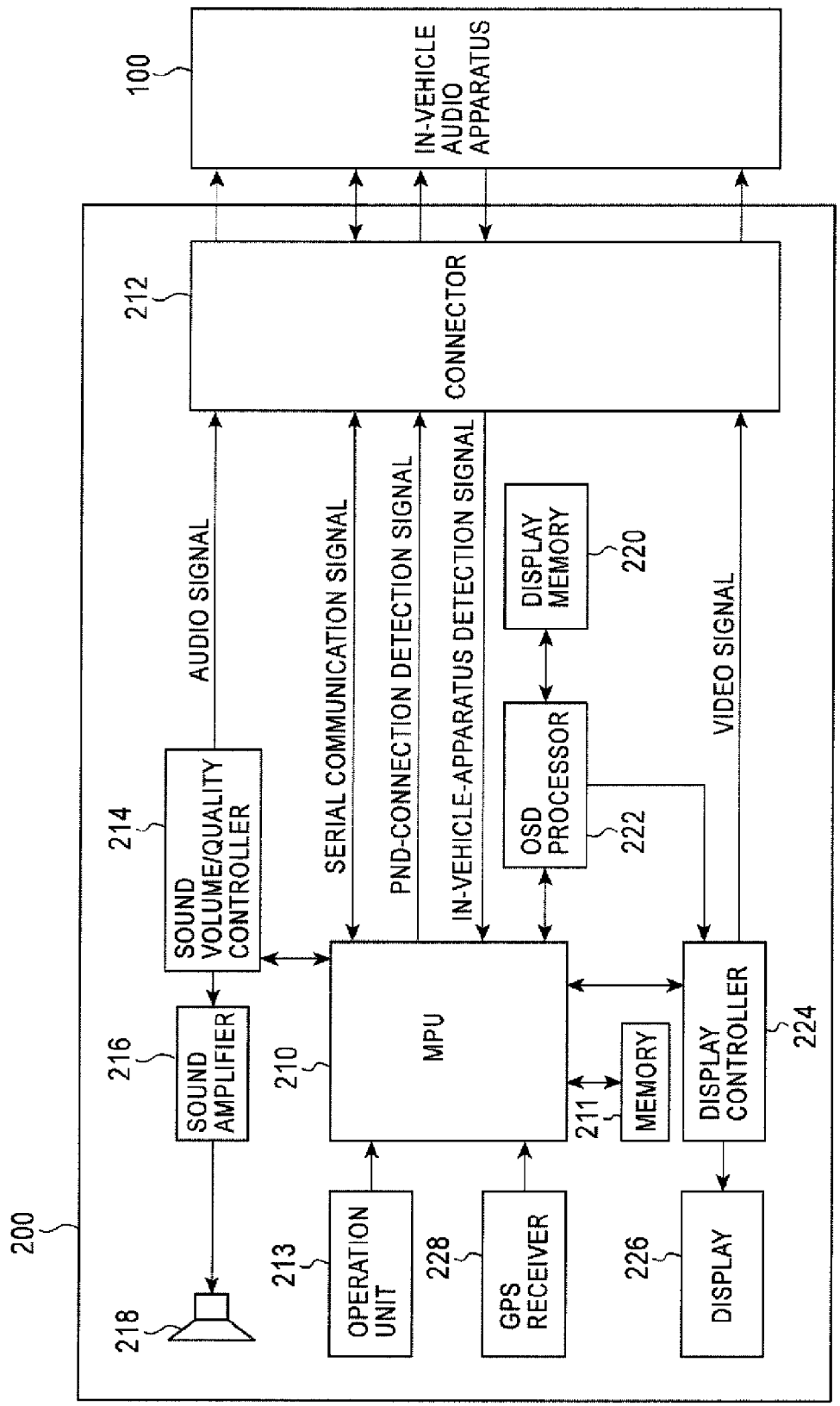
FIG. 3 is a block diagram showing a configuration of the PND.

FIG. 3 is a block diagram of the configuration of the PND 200. In FIG. 3, the PND 200 includes an MPU 210, a memory 211, a connector 212, an operation unit 213, a sound volume/quality controller 214, a sound amplifier 216, a speaker 218, a display memory 220, an OSD processor 222, a display controller 224, a display 226, and a GPS receiver 228.

The MPU 210 controls the entire PND 200 during route-guidance operation and audio-playback operation. The MPU 210 corresponds to transmitting means, first reading means, second reading means, same/different-mode determining means, processing means, operation-mode determining means, route guiding means, and content playback means in certain claims. The memory 211 stores various types of information, such as map data needed for the route-guidance operation and the audio-playback operation. The memory 211 corresponds to first storing means, second storing means, and storing means in certain claims.

The connector 212, the operation unit 213, the sound volume/quality controller 214, the sound amplifier 216, the speaker 218, the display memory 220, the OSD processor 222, the display controller 224, and the display 226 have functions similar to the corresponding components in the in-vehicle audio apparatus 100. Thus, the in-vehicle audio apparatus 100 may be connected to the connector 212, through which a serial communication signal, a PND-connection detection signal, an in-vehicle-apparatus detection signal, a video signal, and an audio signal are communicated between the in-vehicle audio apparatus 100 and the PND 200.

The operation unit 213 is, for example, a touch panel and is operated by the user. The MPU 210 performs various types of control in accordance with a user operation. Under the control of the MPU 210, the sound volume/quality controller 214 sets the sound volume and sound quality of an audio signal received from the MPU 210, outputs the audio signal to the sound amplifier 216, and also transmits the audio signal to the in-vehicle audio apparatus 100 via the connector 212. The sound amplifier 216 amplifies the audio signal supplied from the sound volume/quality controller 214, and the speaker 118 outputs sound. The display memory 220 stores various image data, such as data for a menu screen. Under the control of the MPU 210, the OSD processor 222 generates an image corresponding to image data stored in the display memory 220 and outputs a video signal to the display controller 224. Under the control of the MPU 210, the display controller 224 receives the video signals from the MPU 210 and the OSD processor 222, performs image synthesis and so on as needed, displays an image on the display 226, and transmits the video signal to the in-vehicle audio apparatus 100 via the connector 212.

The GPS receiver 228 receives, from a GPS satellite, a GPS signal required for detecting the location of the PND 200. Based on the GPS signal, the MPU 210 can detect the location of the PND 200.

Next, a description will be given of an operation in the case in which the PND 200 is mounted in the in-vehicle audio apparatus 100 and the in-vehicle audio apparatus 100 and the PND 200 perform processing in cooperation with each other, an operation in the case in which the PND 200 is removed from the in-vehicle audio apparatus 100 and independently performs processing, and an operation in the case in which the PND 200 is re-mounted in the in-vehicle audio apparatus 100 and the in-vehicle audio apparatus 100 and the PND 200 perform processing in cooperation with each other.

Figure 4:
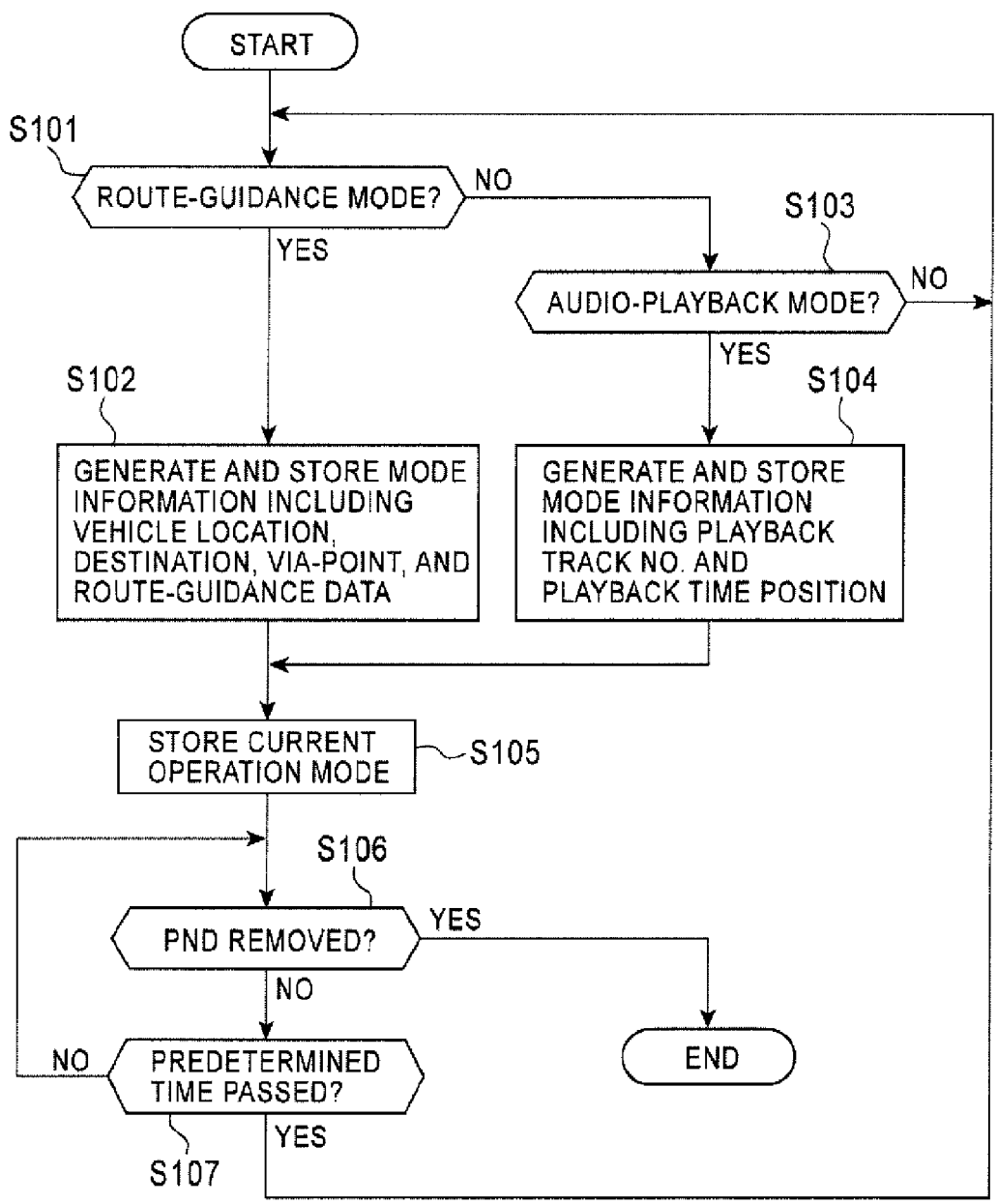
FIG. 4 is a flowchart showing the operation of the in-vehicle audio apparatus or the PND when the PND is mounted in the in-vehicle audio apparatus and the in-vehicle audio apparatus and the PND perform processing in cooperation with each other.

FIG. 4 is a flowchart of an operation of the in-vehicle audio apparatus 100 when the PND 200 is mounted in the in-vehicle audio apparatus 100 and the in-vehicle audio apparatus 100 and the PND 200 perform processing in cooperation with each other.

In step S101, the MPU 110 in the in-vehicle audio apparatus 100 determines whether or not the current operation mode is a route-guidance operation mode (a route guidance mode). When the current operation mode is the route guidance mode, the operation proceeds to step S102. The MPU 110 transmits a serial communication signal to the PND 200 via the connector 112 to request vehicle-location coordinates (longitude and latitude), destination coordinates, via-point coordinates, and guidance-route information.

Upon receiving a vehicle-location-requesting serial communication signal via the connector 212, the MPU 210 in the PND 200 detects the coordinates of the location of the PND 200 as the vehicle-location coordinates, based on the GPS signal received from the GPS receiver 228. The MPU 210 then transmits the detected vehicle-location coordinates to the MPU 110 via the connector 212 and the connector 112 of the in-vehicle audio apparatus 100. Upon receiving the vehicle-location coordinates, the MPU 110 reads destination coordinates, via-point coordinates, and guidance-route information stored in the memory 111, generates mode information including the vehicle-location coordinates, the destination coordinates, the via-point coordinates, and the guidance-route information, and stores the generated mode information in the memory 111 in step S102.

FIG. 5A is a table showing one example of the mode information when the operation mode is the route-guidance mode. In FIG. 5A, the mode information for the route-guidance mode (the mode information will hereinafter be referred to as "route-guidance mode information") has six fields. The second field from the top contains the vehicle-location coordinates, the third field contains destination and via-point coordinates, and the fourth field contains the guidance-route information. The guidance-route information includes a collection of links corresponding to a route from a start point to a destination. Information in the first field is described below.

Returning to FIG. 4, upon determining that the current operation mode is not the route-guidance mode in step S101, the MPU 110 determines whether or not the current operation mode is an audio-playback operation mode (an audio-playback mode) in step S103. When the current operation mode is not the audio-playback mode, the process returns to S101 in which the MPU 110 again determines whether or not the current operation is the route-guidance mode.

On the other hand, when the current operation mode is the audio playback mode, MPU 110 generates mode information including a track number for audio data that is currently played back (the track number will hereinafter be referred to as a "playback track number") and a playback time position of the audio data, and stores the generated mode information in the memory 111 in step S104.

FIG. 5B is a table showing one example of the mode information when the operation mode is the audio playback mode. In FIG. 5B, the mode information for the audio playback mode (the mode information will hereinafter be referred to as "audio-playback mode information") has six fields. The fifth field from the top contains the playback track number and the sixth field contains the playback time position. The first field is described below.

Returning to FIG. 4, after the route-guidance mode information is stored in step S102 or after the audio-playback mode information is stored in step S104, the MPU 110 stores the current operation mode in the memory 111 in step S105 by adding corresponding information to the route-guidance mode information or the audio-playback mode information. More specifically, when the route-guidance mode information is stored in step S102, the MPU 110 adds identification information for the route-guidance mode to the first field shown in FIG. 5A. On the other hand, when the audio-playback mode information is stored in step S104, the MPU 110 adds identification information for the audio playback mode to the first area shown in FIG. 5B.

Next, in step S106, the MPU 110 determines whether or not the PND 200 is removed from the in-vehicle audio apparatus 100. The MPU 210 in the PND 200 periodically outputs a PND-connection detection signal. In this case, while the PND 200 is mounted in the in-vehicle audio apparatus 100, the PND 200 periodically transmits the PND-connection detection signal to the MPU 110 via the connector 212 and the connector 112 of the in-vehicle audio apparatus 100. Thus, when the MPU 110 cannot periodically receive the PND-connection detection signal, it determines that the PND 200 is removed from the in-vehicle audio apparatus 100.

When the PND 200 is removed, the above-described series of operations is finished. On the other hand, upon determining that the PND 200 is not removed, in step S107, the MPU 110 determines whether or not a predetermined time has passed from when the determination (step S101) was made as to whether or not the current operation mode is the route-guidance mode. When the predetermined time has not passed from the operation performed in step S101, the process returns to step S106 in which the MPU 110 again determines whether or not PND 200 is removed. On the other hand, when the predetermined time has passed from the operation performed in step S101, the operations in step S101 and the subsequent steps are repeated. The route-guidance mode information and audio-playback mode information generated and stored when the operation in step S102 or S104 is performed for the second and subsequent times is written over the mode information already stored in the memory 111 at that time.

As described above, until the PND 200 is removed from the in-vehicle audio apparatus 100, the mode information for the operation mode at the time is stored and updated in the memory 111. Thus, when the PND 200 is removed from the in-vehicle audio apparatus 100, the mode information for the operation mode in which the in-vehicle audio apparatus 100 and the PND 200 performed processing in cooperation with each other immediately before the PND 200 was removed from the in-vehicle audio apparatus 100 (the mode information will hereinafter be referred to as "latest cooperation mode information") is stored in the memory 111.

Figure 6:
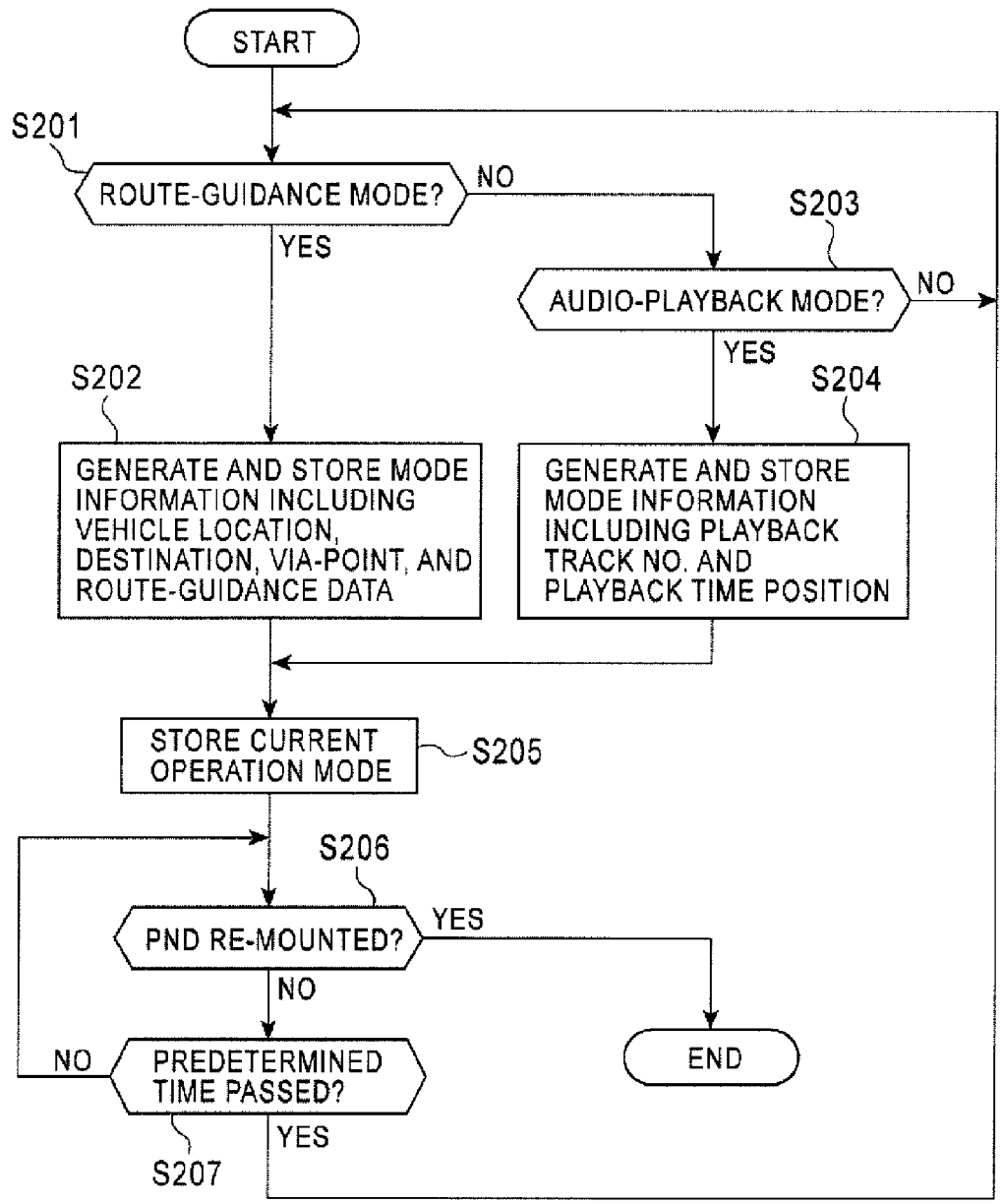
FIG. 6 is a flowchart showing an operation when the PND is removed from the in-vehicle audio apparatus and the PND independently performs processing.

FIG. 6 is a flowchart of an operation of the PND 200 when the PND 200 is removed from the in-vehicle audio apparatus 100 and independently performs an operation.

In step S201, The MPU 210 in the PND 200 determines whether or not the current operation mode is the route-guidance mode. When the current operation mode is the route-guidance mode, the MPU 210 detects the coordinates of the location of the PND 200 as vehicle-location coordinates, based on the GPS signal received from the GPS receiver 228. Next, in step S202, the MPU 210 reads destination coordinates, via-point coordinates, and guidance-route information stored in the memory 211, generates route-guidance mode information including the vehicle-location coordinates, the destination coordinates, the via-point coordinates, and the guidance-route information, and stores the generated route-guidance mode information in the memory 211.

On the other hand, upon determining that the current operation mode is not the route-guidance mode in step S201, the MPU 210 determines whether or not the current operation mode is the audio-playback mode in step S203. When the current operation mode is not the audio-playback mode, the process returns to step S201 and the MPU 111 again determines whether or not the current operation is the route-guidance mode.

On the other hand, when the current operation mode is the audio playback mode, the MPU 210 generates audio-playback mode information including a playback track number for audio data that is currently played back and a playback time position of the audio data, and stores the generated audio-playback mode information in the memory 211 in step S204.

After the route-guidance mode information is stored in step S202 or after the audio-playback mode information is stored in step S204, the MPU 210 stores the current operation mode in the memory 211 in step S205 by adding corresponding information to the route-guidance mode information or the audio-playback mode information.

Next, in step S206, the MPU 210 determines whether or not the PND 200 is re-mounted in the in-vehicle audio apparatus 100. The MPU 110 in the in-vehicle audio apparatus 100 periodically outputs an in-vehicle-apparatus connection detection signal. In this case, when the PND 200 is re-mounted in the in-vehicle audio apparatus 100, the MPU 110 periodically transmits the in-vehicle-apparatus connection detection signal to the MPU 210 via the connector 112 and the connector 212 of the PND 200. Thus, upon receiving the in-vehicle-apparatus connection detection signal, the MPU 210 can determine that the PND 200 is re-mounted in the in-vehicle audio apparatus 100.

When the PND 200 is re-mounted, the above-described series of operations is finished. On the other hand, upon determining that the PND 200 is not re-mounted, in step S207, the MPU 210 determines whether or not a predetermined time has passed from when the determination (step S201) was made as to whether or not the current operation mode is the route-guidance mode. When the predetermined time has not passed from the operation performed in step S201, the process returns to step S206 in which the MPU 210 again determines whether or not the PND 200 is re-mounted. On the other hand, when the predetermined time has passed from the operation performed in step S201 the operations in step S201 and the subsequent steps are repeated. The route-guidance mode information or audio-playback mode information generated and stored when the operation in step S102 or S104 is performed for the second and subsequent times is written over the mode information already stored in the memory 211 at that time.

As described above, until the PND 200 is re-mounted in the in-vehicle audio apparatus 100, the mode information for the operation mode at the time is stored and updated in the memory 211. Thus, when the PND 200 is re-mounted in the in-vehicle audio apparatus 100, the mode information for the operation mode in which the PND 200 independently performed processing immediately before the PND 200 was re-mounted in the in-vehicle audio apparatus 100 (the mode information will hereinafter be referred to as "latest independence mode information") is stored in the memory 211.

Figure 7:
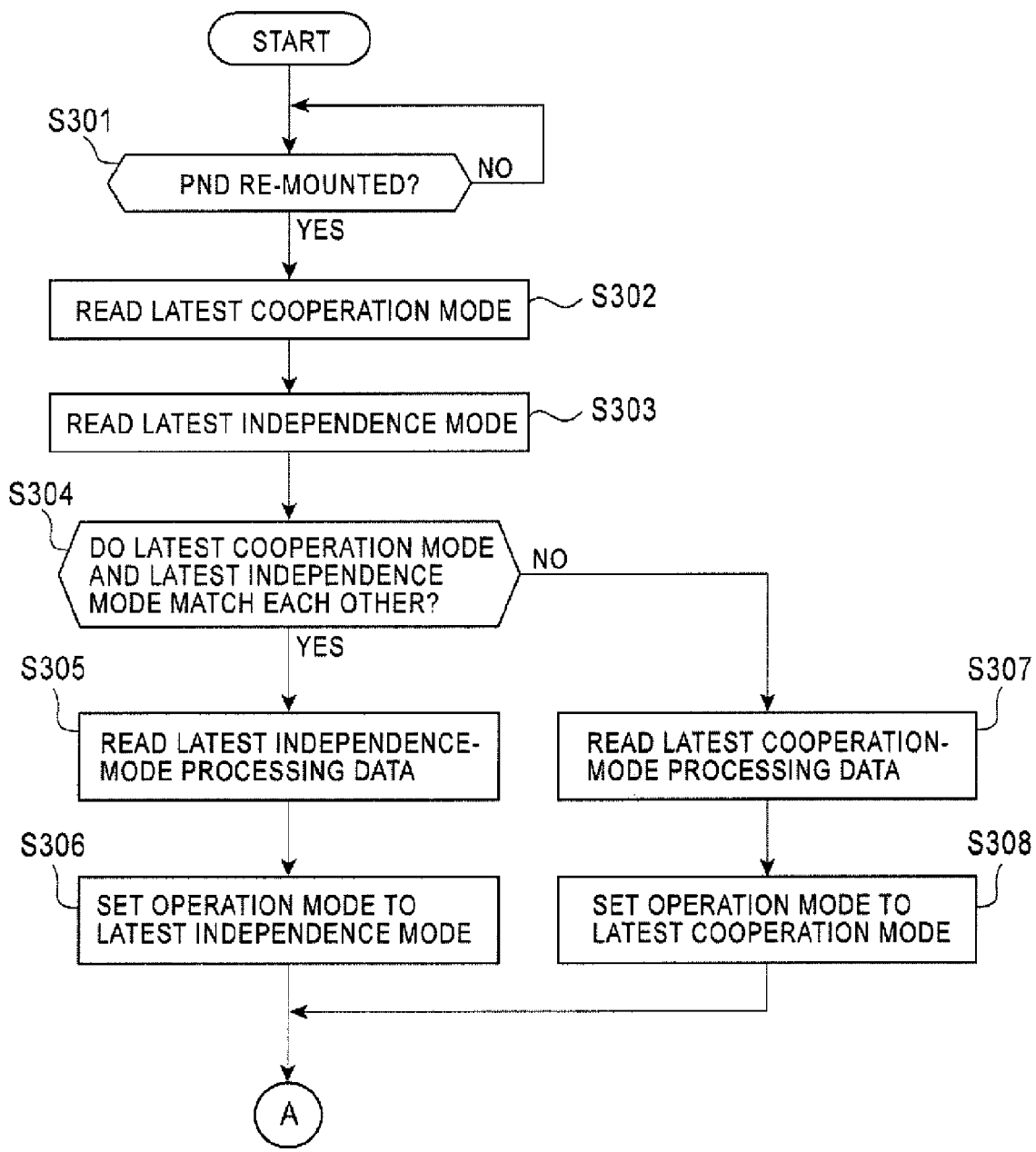
FIG. 7 is a flowchart showing a first operation of the in-vehicle audio apparatus or the PND when the PND is re-mounted in the in-vehicle audio apparatus and the in-vehicle audio apparatus and the PND perform processing in cooperation with each other.
Figure 8:
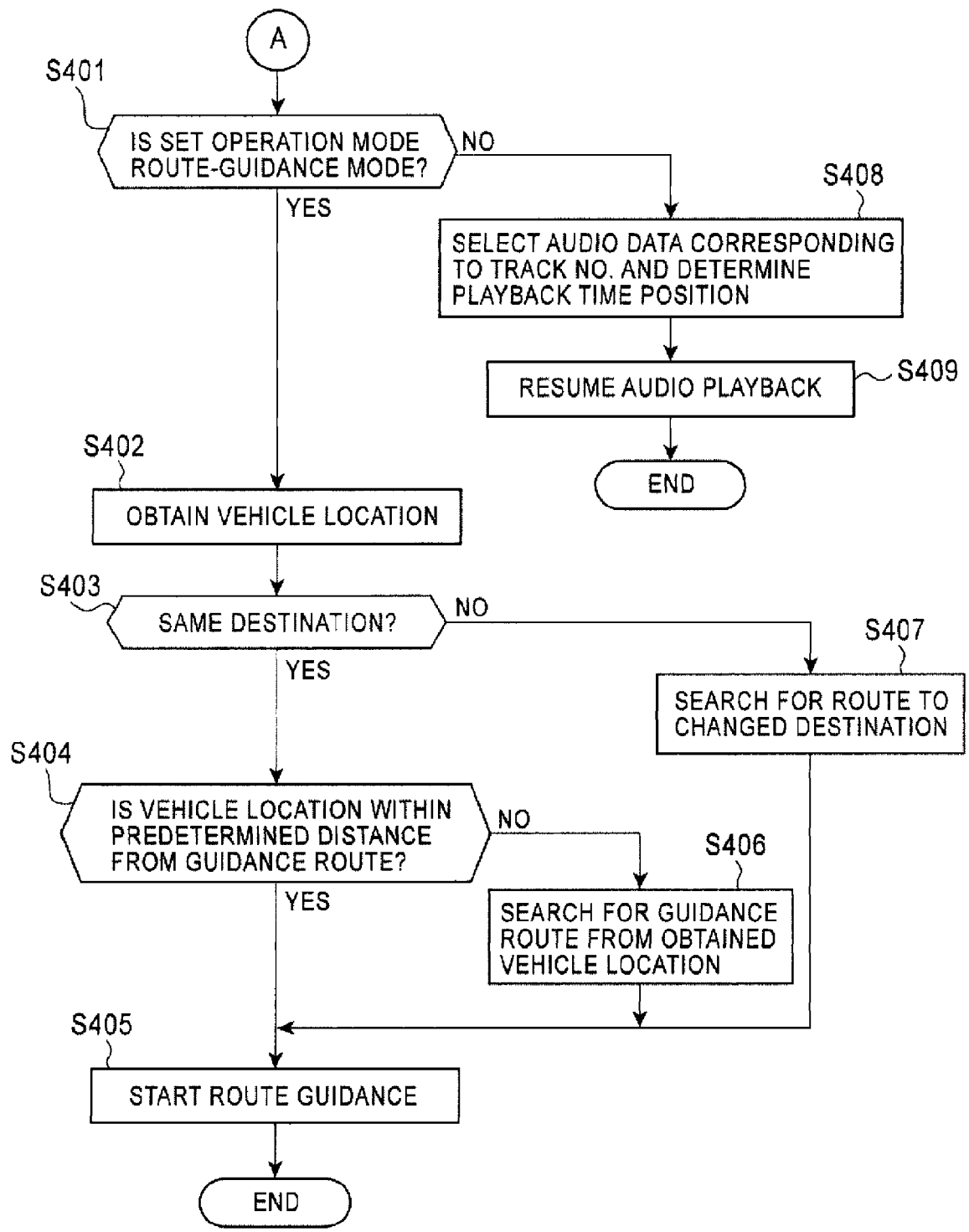
FIG. 8 is a flowchart showing a second operation of the in-vehicle audio apparatus or the PND when the PND is re-mounted in the in-vehicle audio apparatus and the in-vehicle audio apparatus and the PND perform processing in cooperation with each other.

FIGS. 7 and 8 are flowcharts showing an operation of the in-vehicle audio apparatus 100 when the PND 200 is re-mounted in the in-vehicle audio apparatus 100 and the in-vehicle audio apparatus 100 and the PND 200 perform processing in cooperation with each other.

In step S301, the MPU 110 in the in-vehicle audio apparatus 100 determines whether or not the PND 200 is re-mounted in the in-vehicle audio apparatus 100. Upon periodically receiving the PND-connection detection signal from the MPU 210 in the PND 200, the MPU 110 can determine that the PND 200 is re-connected to the in-vehicle audio apparatus 100.

When the PND 200 is re-mounted in the in-vehicle audio apparatus 100, the MPU 110 reads the operation mode in the latest cooperation mode information in step S302 (this operation mode will hereinafter be referred to as a "latest cooperation mode"). Since the latest cooperation mode information is stored in the memory 111, as described above, the MPU 110 reads, as the latest cooperation mode, the operation mode in the latest cooperation mode information stored in the memory 111.

Next, in step S303, the MPU 110 reads the operation mode in the latest independence mode information (this operation mode will hereinafter be referred to as a "latest independence mode"). As described above, the latest independence mode information is stored in the memory 211 in the PND 200. The MPU 110 transmits, to the PND 200 via the connector 112, a serial communication signal for requesting the latest independence mode. Upon receiving the latest-independence-mode-requesting serial communication signal via the connector 112, the MPU 210 reads the operation mode in the latest independence mode information stored in the memory 211 and transmits, as the latest independence mode, the read operation mode to the MPU 110 via the connector 212 and the connector 112 of the in-vehicle audio apparatus 100. By receiving the latest independence mode, the MPU 110 reads the latest independence mode.

Next, in step S304, the MPU 110 determines whether or not the read latest cooperation mode and the latest independence mode match each other, that is, whether or not the operation mode in which the in-vehicle audio apparatus 100 and the PND 200 performed processing in cooperation with each other immediately before the PND 200 was removed from the in-vehicle audio apparatus 100 and the operation mode in which the PND 200 independently performed processing immediately before the PND 200 was re-mounted in the in-vehicle audio apparatus 100 match each other.

When the latest cooperation mode and the latest independence mode match each other, the MPU 110 reads pieces of information (hereinafter be referred to as "latest independence mode processing data") in the latest independence information in step S305. More specifically, the MPU 110 transmits a serial communication signal for requesting the latest independence mode processing data to the PND 200 via the connector 112. Upon receiving the latest-independence-mode-requesting serial communication signal via the connector 212, the MPU 210 in the PND 200 reads information other than the mode information in the latest independence mode information stored in the memory 211. Examples of the read information include the vehicle-location coordinates, the destination and via-points coordinates, and the guidance-route information shown in FIG. 5A and the playback track number and the playback time position shown in FIG. 5B. Next, the MPU 210 transmits the read information, as the latest independence mode processing data, to the MPU 110 via the connector 212 and the connector 112 of the in-vehicle audio apparatus 100. By receiving the latest independence mode processing data, The MPU 110 reads the processing data.

In step S306, the MPU 110 sets the operation mode to the latest independence mode read in step S303, that is, to the operation mode in which the PND 200 independently performed processing immediately before the PND 200 was re-mounted in the in-vehicle audio apparatus 100. In this case, for example, identification information for the latest independence mode is stored in the memory 111.

On the other hand, when the latest independence mode and the latest cooperation mode do not match each other in step S304, the MPU 110 reads information (hereinafter referred to as "latest cooperation mode processing data") in the latest cooperation mode information stored in the memory 111 in step S307. In step S308, the MPU 110 sets the operation mode to the latest cooperation mode read in step S302, that is, to the operation mode in which the in-vehicle audio apparatus 100 and the PND 200 performed processing in cooperation with each other immediately before the PND 200 was removed from the in-vehicle audio apparatus 100. In this case, for example, identification information for the latest cooperation mode is stored in the memory 111.

After the operation mode is set to the latest independence mode in step S306 or after the operation mode is set to the latest cooperation mode in step S308, the process proceeds to the operations shown in FIG. 8. In step S401, the MPU 110 determines whether or not the operation mode set in step S306 or S308 is the route-guidance mode.

When the operation mode set in step S306 or S308 is the route guidance mode, the MPU 110 obtains a vehicle location in step S402. More specifically, as in step S102 shown in FIG. 4, the MPU 110 transmits, to the PND 200 via the connector 112, a serial communication signal for requesting the vehicle-location coordinates. Upon receiving the vehicle-location-coordinate-requesting serial communication signal via the connector 112, the MPU 210 in the PND 200 detects the vehicle-location coordinates based on the GPS signal received from the GPS receiver 228. The MPU 210 then transmits the detected vehicle-location coordinates to the MPU 110 via the connector 212 and the connector 112 of the in-vehicle audio apparatus 100. By receiving the vehicle-location coordinates, the MPU 110 obtains the vehicle-location coordinates.

Next, in step S403, the MPU 110 determines whether or not the destination coordinates in the latest independence mode processing data and the destination coordinates in the latest cooperation mode processing data match each other. More specifically, when the latest independence mode processing data stored in the memory 211 in the PND 200 is read in step S305, the MPU 110 reads the latest cooperation mode processing data stored in the memory 111 and determines whether or not the destination coordinates in the latest independence mode processing data and the destination coordinates in the latest cooperation mode processing data match each other. When the latest cooperation mode processing data stored in the memory 111 is read in step S307, the MPU 110 reads the latest independence mode processing data stored in the memory 211 in the PND 200 and determines whether or not the destination coordinates in the latest independence mode processing data and the destination coordinates in the latest cooperation mode processing data match each other.

When the destination coordinates in the latest independence mode processing data and the destination coordinates in the latest cooperation mode processing data match each other, in step S404, the MPU 110 determines whether or not the vehicle location obtained in step S402 is within a predetermined distance from a guidance route (including a case in which the vehicle location is on a guidance route). More specifically, when the latest independence mode stored in the memory 211 in the PND 200 is read in step S305, the MPU 110 determines whether or not the vehicle location is within a predetermined distance from a guidance route by comparing a guidance-route location identified by the guidance-route information in the latest independence mode processing data with the vehicle location obtained in step S402. When the latest cooperation mode processing data stored in the memory 111 is read in step S307, the MPU 110 determines whether or not the vehicle location is within a predetermined distance from a guidance route by comparing a guidance-route location identified by the guidance-route information in the latest cooperation mode processing data with the vehicle location obtained in step S402.

When the vehicle location is within the predetermined distance from the guidance route and the latest independence mode processing data stored in the memory 211 in the PND 200 is read in step S305, the MPU 110 starts route guidance in step S405, based on the guidance-route information in the latest independence mode processing data. On the other hand, when the vehicle location is within the predetermined distance from the guidance route and the latest cooperation mode processing data stored in the memory 111 is read in step S307, the MPU 110 starts route guidance in step S405, based on the guidance-route information in the latest cooperation mode processing data. In the route guidance, the MPU 110 periodically obtains the vehicle location from the PND 200. The MPU 110 also reads map data stored in the memory 111 or the memory 211 in the PND 200, generates an image of the vicinity of the vehicle location, and outputs a video signal to the display controller 124. The display controller 124 receives the video signal and displays an image on the display 126. The MPU 110 outputs an audio signal for various types of voice instruction and sound for guidance, including left turn and right turn, to the sound volume/quality controller 114. The sound volume/quality controller 114 sets the sound volume and sound quality of the audio signal and outputs the resulting audio signal to the sound amplifier 116. The sound amplifier 116 amplifies the audio signal received from the sound volume/quality controller 114 and the speaker 118 outputs sound.

On the other hand, upon determining that the vehicle location is not within the predetermined distance from the guidance route in step S404, in step S406, the MPU 110 searches for a guidance route from the vehicle location obtained in step S402. More specifically, when the latest independence mode processing data stored in the memory 211 in the PND 200 is read in step S305, the MPU 110 searches for a guidance route from the vehicle location to the destination, based on the destination coordinates and the via-point coordinates in the latest independence mode processing data, the vehicle location obtained in step S402, and the map data stored in the memory 111 or the memory 211 in the PND 200. On the other hand, when the latest cooperation mode processing data stored in the memory 111 is read in step S307, the MPU 110 searches for a guidance route from the vehicle location to the destination, based on the destination coordinates and the via-point coordinates in the latest cooperation mode processing data, the vehicle location obtained in step S402, and the map data stored in the memory 111 or the memory 211 in the PND 200. Thereafter, in step S405, route guidance based on the found guidance route is performed.

When it is determined that the destination coordinates are not the same in step S403 and the latest independence mode processing data stored in the memory 211 in the PND 200 is read in step S305, the MPU 110 searches for a guidance route from the vehicle location to the destination, based on the destination coordinates and the via-point coordinates in the latest independence mode processing data, the vehicle location obtained in step S402, and the map data stored in the memory 111 or the memory 211 in the PND 200. On the other hand, when the latest cooperation mode processing data stored in the memory 111 is read in step S307, in step S407, the MPU 110 searches for a guidance route from the vehicle location to the destination, based on the destination coordinates and the via-point coordinates in the latest cooperation mode processing data, the vehicle location obtained in step S402, and the map data stored in the memory 111 or the memory 211 in the PND 200. Thereafter, in step S405, route guidance based on the found guidance route is performed.

When it is determined in step S401 that the set operation mode is not the route-guidance mode, in other words, when it is determined that the set operation mode is the audio-playback mode, and also the latest independence mode processing data stored in the memory 211 in the PND 200 is read in step S305, the MPU 110 reads audio data that corresponds to a playback track number in the latest independence mode processing data and that is stored in the memory 111 or the memory 211 in the PND 200, and further specifies a playback time position in the latest independence mode processing data as a resume position in step S408. In step S409, the MPU 110 resumes audio playback from the resume position. In the audio playback, the MPU 110 outputs, to the sound volume/quality controller 114, an audio signal corresponding to the read audio data. The sound volume/quality controller 114 sets the sound volume and sound quality of the audio signal and outputs the resulting audio signal to the sound amplifier 116. The sound amplifier 116 amplifies the audio signal received from the sound volume/quality controller 114, and the speaker 118 outputs sound.

When it is determined in step S401 that the set operation mode is not the route guidance mode and the latest cooperation mode processing data stored in the memory 111 is read in step S307, the MPU 110 reads audio data that corresponds to a playback track number in the latest cooperation mode processing data and that is stored in the memory 111 or the memory 211 in the PND 200, and further specifies a playback time position in the latest cooperation mode processing data as a resume position in step S408. In step S409, the MPU 110 resumes audio playback from the resume position.

Thus, when the operation mode (the latest cooperation mode) in which the in-vehicle audio apparatus 100 and the PND 200 perform processing in cooperation with each other immediately before the PND 200 is removed and the operation mode (the latest independence mode) in which the PND 200 independently performs processing immediately before the PND 200 is re-mounted in the in-vehicle audio apparatus 100 after being removed therefrom are the same, the in-vehicle audio apparatus 100 performs processing using the processing data in the latest independence mode and can take over the route-guidance operation or content-playback operation independently performed by the PND 200. On the other hand, when the latest cooperation mode and the latest independence mode are different from each other, the in-vehicle audio apparatus 100 performs processing using the processing data in the latest cooperation mode and can take over the route-guidance operation or content-playback operation performed by the in-vehicle audio apparatus 100 and the PND 200 in cooperation with each other.

Although the MPU 110 in the in-vehicle audio apparatus 100 generates the route-guidance mode information and stores the mode information in the memory 111 in step S102 shown in FIG. 4 and generates the audio-playback mode information and stores the mode information in the memory 111 in step S104 in the above-described embodiment, the arrangement may also be such that the MPU 110 transmits the route-guidance mode information and the audio-playback mode information to the MPU 210 in the PND 200 and the MPU 210 stores the route-guidance mode information and the audio-playback mode information in the memory 211. In such a case, in step S105 shown in FIG. 4, the MPU 110 transmits the current operation mode to the MPU 210 in the PND 200 and the MPU 210 stores the operation mode in the memory 211. In addition, in step S302 shown in FIG. 7, the MPU 110 reads the latest cooperation mode in the latest cooperation mode information stored in the memory 211 in the PND 200, and in step S307, the MPU 110 reads the latest cooperation mode processing data in the latest cooperation mode information stored in the memory 211 in the PND 200.

The MPU 210 in the PND 200 may perform the operations shown in FIGS. 4, 7, and 8. That is, in accordance with the flowchart shown in FIG. 4, the MPU 210 in the PND 200 determines whether or not the current operation mode is the route guidance mode in step S101. When the current operation mode is the route guidance mode, the MPU 210 detects the vehicle-location coordinates based on the GPS signal received from the GPS receiver 228. In step S102, the MPU 210 further reads destination coordinates, via-point coordinates, and guidance-route information stored in the memory 211, generates route-guidance mode information including the vehicle-location coordinates, the destination coordinates, the via-point coordinates, and the guidance-route information, and stores the generated route-guidance mode information in the memory 211.

On the other hand, when the current operation mode is not the route-guidance mode, the MPU 210 determines whether or not the current operation mode is the audio playback mode in step S103. When the current operation mode is not the audio playback mode, the process returns to S101 in which the MPU 210 again determines whether or not the current operation is the route-guidance mode. On the other hand, when the current operation mode is the audio playback mode, the MPU 210 generates audio-playback mode information including a playback track number for audio data that is currently played back and a playback time position of the audio data, and stores the generated audio-playback mode information in the memory 211 in step S104.

After the route-guidance mode information is stored in step S102 or after the audio-playback mode information is stored in step S104, the MPU 210 stores the current operation mode in the memory 211 in step S105 by adding corresponding information to the route-guidance mode information or the audio-playback mode information.

Next, in step S106, the MPU 210 determines whether or not the PND 200 is removed from the in-vehicle audio apparatus 100. The MPU 110 in the in-vehicle audio apparatus 100 periodically outputs an in-vehicle-apparatus connection detection signal. In this case, while the PND 200 is mounted in the in-vehicle audio apparatus 100, the MPU 110 periodically transmits the in-vehicle-apparatus connection detection signal to the MPU 210 via the connector 112 and the connector 212 of the PND 200. Thus, when the MPU 210 cannot periodically receive the in-vehicle-apparatus connection detection signal, it can determine that the PND 200 is removed from the in-vehicle audio apparatus 100.

When the PND 200 is removed, the above-described series of operations is finished. On the other hand, upon determining that the PND 200 is not removed, in step S107, the MPU 210 determines whether or not a predetermined time has passed from when the determination (step S101) was made as to whether or not the current operation mode is the route-guidance mode. When the predetermined time has not passed from the operation performed in step S101, the process returns to step S106 in which MPU 210 again determines whether or not the PND 200 is removed. On the other hand, when the predetermined time has passed from the operation performed in step S101, the operations in step S101 and the subsequent steps are repeated.

As described above, until the PND 200 is removed from the in-vehicle audio apparatus 100, the mode information for the operation mode at the time is stored and updated in the memory 211. Thus, when the PND 200 is removed from the in-vehicle audio apparatus 100, the latest cooperation mode information corresponding to the operation mode in which the in-vehicle audio apparatus 100 and the PND 200 performed processing in cooperation with each other immediately before the PND 200 was removed from the in-vehicle audio apparatus 100 is stored in the memory 211.

A description will now be given with reference back to the flowcharts shown in FIGS. 7 and 8. In step S301, the MPU 210 in the PND 200 determines whether or not the PND 200 is re-mounted in the in-vehicle audio apparatus 100. More specifically, upon periodically receiving the in-vehicle-apparatus connection detection signal from the MPU 110 in the in-vehicle audio apparatus 100, the MPU 210 can determine that the PND 200 is re-connected to the in-vehicle audio apparatus 100.

When the PND 200 is re-mounted in the in-vehicle audio apparatus 100, the MPU 210 reads the latest cooperation mode in the latest cooperation mode information in step S302 which is stored in the memory 211. Next, in step S303, the MPU 110 reads the latest independence mode in the latest independence mode information stored in the memory 211. In addition, in step S304, the MPU 210 determines whether or not the read latest cooperation mode and the latest independence mode match each other, that is, whether or not the operation mode in which the in-vehicle audio apparatus 100 and the PND 200 performed processing in cooperation with each other immediately before the PND 200 was removed from the in-vehicle audio apparatus 100 and the operation mode in which the PND 200 independently performed processing immediately before the PND 200 was re-mounted in the in-vehicle audio apparatus 100 match each other.

When the latest cooperation mode and the latest independence mode match each other, in step S305, the MPU 210 reads the latest independence mode processing data in the latest independence mode information stored in the memory 211. In step S306, the MPU 210 sets the operation mode to the latest independence mode read in step S303, that is, to the operation mode in which the PND 200 independently performed processing immediately before the PND 200 was re-mounted in the in-vehicle audio apparatus 100. In this case, for example, identification information for the latest independence mode is stored in the memory 211.

On the other hand, upon determining that the latest independence mode and the latest cooperation mode do not match each other, in step S307 the MPU 210 reads the latest cooperation mode processing data in the latest cooperation mode information stored in the memory 211. In step S308, the MPU 210 sets the operation mode to the latest cooperation mode read in step S302, that is, to the operation mode in which the in-vehicle audio apparatus 100 and the PND 200 performed processing in cooperation with each other immediately before the PND 200 was removed from the in-vehicle audio apparatus 100. In this case, for example, identification information for the latest cooperation mode is stored in the memory 211.

After the operation mode is set to the latest independence mode in step S306 or after the operation mode is set to the latest cooperation mode in step S308, the process proceeds to the operations shown in FIG. 8. In step S401, the MPU 210 determines whether or not the operation mode set in step S306 or S308 is the route-guidance mode. When the operation mode set in step S306 or S308 is the route guidance mode, the MPU 210 obtains the vehicle location in step S402. More specifically, the MPU 210 detects the vehicle-location coordinates based on the GPS signal received from the GPS receiver 228.

Next, in step S403, the MPU 210 determines whether or not the destination coordinates in the latest independence mode processing data and the destination coordinates in the latest cooperation mode processing data match each other. More specifically, when the latest independence mode processing data stored in the memory 211 is read in step S305, the MPU 210 reads the latest cooperation mode processing data stored in the memory 211 and determines whether or not the destination coordinates in the latest independence mode processing data and the destination coordinates in the latest cooperation mode processing data match each other. When the latest cooperation mode processing data stored in the memory 211 is read in step S307, the MPU 210 reads the latest independence mode processing data stored in the memory 211 and determines whether or not the destination coordinates in the latest independence mode processing data and the destination coordinates in the latest cooperation mode processing data match each other.

When the destination coordinates in the latest independence mode processing data and the destination coordinates in the latest cooperation mode processing data match each other, in step S404 the MPU 210 determines whether or not the vehicle location obtained in step S402 is within a predetermined distance from a guidance route (including a case in which the vehicle location is located on a guidance route). More specifically, when the latest independence mode processing data stored in the memory 211 is read in step S305, the MPU 210 determines whether or not the vehicle location is within the predetermined distance from the guidance route by comparing a guidance-route location identified by the guidance-route information in the latest independence mode processing data with the vehicle location obtained in step S402. When the latest cooperation mode processing data stored in the memory 211 is read in step S307, the MPU 210 determines whether or not the vehicle location is within the predetermined distance from the guidance route by comparing a guidance-route location identified by the guidance-route information in the latest cooperation mode processing data with the vehicle location obtained in step S402.

When the vehicle location is within the predetermined distance from the guidance route and the latest independence mode processing data stored in the memory 211 is read in step S305, the MPU 210 starts route guidance in step S405, based on the guidance-route information in the latest independence mode processing data. On the other hand, when the vehicle location is within the predetermined distance from the guidance route and the latest cooperation mode processing data stored in the memory 211 is read in step S307, the MPU 210 starts route guidance in step S405, based on the guidance-route information in the latest cooperation mode processing data. In the route guidance, the MPU 210 periodically obtains the vehicle location. The MPU 210 also reads map data stored in the memory 211, generates an image of the vicinity of the vehicle location, and outputs a video signal to the display controller 224. The display controller 224 outputs the video signal to the display controller 124 via the connector 212 and the connector 112 of the in-vehicle audio apparatus 100. The display controller 124 causes the display 126 to display the image. The MPU 210 outputs an audio signal for various types of voice instructions and sound for guidance, including left turn and right turn, to the sound volume/quality controller 114. The sound volume/quality controller 114 sets the sound volume and sound quality of the audio signal and outputs the resulting audio signal to the sound amplifier 116 via the connector 212, the connector 112, and the sound volume/quality controller 114. The sound amplifier 116 amplifies the audio signal and the speaker 118 outputs sound.

On the other hand, upon determining that the vehicle location is not within the predetermined distance from the guidance route in step S404, in step S406 the MPU 210 searches for a guidance route from the vehicle location obtained in step S402. More specifically, when the latest independence mode processing data stored in the memory 211 is read in step S305, the MPU 210 searches for a guidance route from the vehicle location to the destination, based on the destination coordinates and the via-point coordinates in the latest independence mode processing data, the vehicle location obtained in step S402, and the map data stored in the memory 211. On the other hand, when the latest cooperation mode processing data stored in the memory 211 is read in step S307, the MPU 210 searches for a guidance route from the vehicle location to the destination in step S406, based on the destination coordinates and the via-point coordinates in the latest cooperation mode processing data, the vehicle location obtained in step S402, and the map data stored in the memory 211. Thereafter, in step S405, route guidance based on the found guidance route is performed.

When it is determined in step S403 that the destination coordinates are not the same and the latest independence mode processing data stored in the memory 211 is read in step S305, the MPU 210 searches for a guidance route from the vehicle location to the changed destination in step S407, based on the destination coordinates and the via-point coordinates in the latest independence mode processing data, the vehicle location obtained in step S402, and the map data stored in the memory 211. On the other hand, when the latest cooperation mode processing data stored in the memory 211 is read in step S307, the MPU 210 searches for a guidance route from the vehicle location to the changed destination in step S407, based on the destination coordinates and the via-point coordinates in the latest cooperation mode processing data, the vehicle location obtained in step S402, and the map data stored in the memory 211. Thereafter, in step S405, route guidance based on the found guidance route is performed.

When it is determined in step S401 that the set operation mode is not the route guidance mode and the latest independence mode processing data stored in the memory 211 is read in step S305, the MPU 210 reads audio data that corresponds to a playback track number in the latest independence mode processing data and that is stored in the memory 211, and further specifies a playback time position in the latest independence mode processing data as a resume position in step S408. In step S409, the MPU 210 resumes audio playback from the resume position. In the audio playback, the MPU 210 outputs, to the sound volume/quality controller 214, an audio signal corresponding to the read audio data. The sound volume/quality controller 214 sets the sound volume and sound quality of the audio signal and outputs the resulting audio signal to the sound amplifier 116 via the connector 212, the connector 112, and the sound volume/quality controller 114 of the in-vehicle audio apparatus 100. The sound amplifier 116 amplifies the audio signal and the speaker 118 outputs sound.

When it is determined in step S401 that the set operation mode is not the route guidance mode and the latest cooperation mode processing data stored in the memory 211 is read in step S307, the MPU 210 reads audio data that corresponds to a playback track number in the latest cooperation mode processing data and that is stored in the memory 211, and further specifies a playback time position in the latest cooperation mode processing data as a resume position in step S408. In step S409, the MPU 210 resumes audio playback from the resume position.

Although the determination is made in step S106 in FIG. 4 as to whether or not the PND 200 is removed from the in-vehicle audio apparatus 100, a determination may be made as to whether or not the PND 200 is disconnected from a power supply. When the PND 200 is disconnected from the power supply, the series of operations is finished, and when the PND 200 is not disconnected from the power supply, the determination (step S107) may be made as to whether or not the predetermined time has passed from the operation performed in step S101. With this arrangement, a determination as to whether or not the PND 200 is re-connected to the power supply is made instead of the operation performed in step S206 in FIG. 6, and when the PND 200 is reconnected to the power supply, the series of operations is finished. When the PND 200 is not connected to the power supply, the determination (step S207) is made as to whether or not the predetermined time has passed from the operation performed in step S201. In addition, a determination as to whether or not the PND 200 is reconnected to the power supply is made instead of the operation performed in step S301 in FIG. 7, and when the PND 200 is re-connected to the power supply, the latest cooperation mode is read in step S302, and so on.

Although a case in which audio data is played back has been described in the above-described embodiment, the present invention is also applicable to a case in which, for example, visual content, other than audio data, is played back.

As described above, the navigation system, the in-vehicle apparatus, and the portable terminal according to the present invention are capable of appropriately taking over a route-guidance operation and a content-playback operation and are advantageously used for, for example, a navigation system and on the like.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. An in-vehicle apparatus installed in a vehicle, a portable terminal being removably mounted in the in-vehicle apparatus, wherein when the portable terminal is mounted in the in-vehicle apparatus, the in-vehicle apparatus selectively performs processing in a route-guidance operation mode and processing in a content-playback operation mode in cooperation with the portable terminal, the in-vehicle apparatus comprising:

first storing means for storing a first operation mode before the portable terminal is removed from the in-vehicle apparatus or is disconnected from a power supply and processing data in the first operation mode, the in-vehicle apparatus and the portable terminal performing processing in cooperation with each other in the first operation mode;

first reading means for reading the first operation mode stored in the first storing means when the portable terminal is re-mounted in the in-vehicle apparatus after being removed therefrom or is re-connected to the power supply after being disconnected therefrom, and for reading a second operation mode existing before the portable terminal is re-mounted in the in-vehicle apparatus after being removed therefrom or is re-connected to the power supply after being disconnected therefrom, the second operation mode being stored in the portable terminal and the portable terminal independently performing processing in the second operation mode;

same/different-mode determining means for determining whether or not the first operation mode and the second operation mode read by the first reading means are the same;

second reading means for reading processing data in the second operation mode existing before the portable terminal is re-mounted in the in-vehicle apparatus after being removed therefrom or is re-connected to the power supply after being disconnected therefrom when the same/different-mode determining means determines that the first operation mode and the second operation mode are the same, and for reading the processing data in the first operation mode when the same/different-mode determining means determines that the first operation mode and the second operation mode are different from each other, the processing data in the second operation mode being stored in the portable terminal and the processing data in the first operation mode being stored in the first storing means; and processing means for performing processing using the processing data read by the second reading means, in cooperation with the portable terminal.

2. The in-vehicle apparatus according to claim 1, wherein the processing means comprises:

operation-mode determining means for determining whether or not the second operation mode is the route-guidance operation mode when the same/different-mode determining means determines that the first operation mode and the second operation mode are the same, and for determining whether or not the first operation mode is the route-guidance operation mode when the same/different-mode determining means determines that the first operation mode and the second operation mode are different from each other;

route guiding means for performing, when the same/different-mode determining means determines that the first operation mode and the second operation mode are the same and the operation-mode determining means determines that the second operation mode is the route-guidance operation mode, route guidance based on processing data in the route-guidance operation mode, the processing data being read by the second reading means and being the processing data in the second operation mode, and performing, when the same/different-mode determining means determines that the first operation mode and the second operation mode are different from each other and the operation-mode determining means determines that the first operation mode is the route-guidance operation mode, route guidance based on processing data in the route-guidance operation mode, the processing data being read by the second reading means and being the processing data in the first operation mode; and content playback means for performing, when the same/different-mode determining means determines that the first operation mode and the second operation mode are the same and the operation-mode determining means determines that the second operation mode is the content-playback operation mode, content playback based on processing data in the content-playback operation mode, the processing data being read by the second reading means and being the processing data in the second operation mode, and performing, when the same/different-mode determining means determines that the first operation mode and the second operation mode are different from each other and the operation-mode determining means determines that the first operation mode is the content-playback operation mode, content playback based on processing data in the content-playback operation mode, the processing data being read by the second reading means and being the processing data in the first operation mode.

3. The in-vehicle apparatus according to claim 2, wherein the processing data in the route-guidance operation mode includes a destination location and guidance-route information, and wherein the route guiding means comprises vehicle-location obtaining means for obtaining a location of the vehicle, and route searching means for searching for, when the vehicle location obtained by the vehicle-location obtaining means is at a predetermined distance or more away from a guidance route identified by the guidance-route information, a guidance route from the vehicle location to the destination location, and for searching for, when the destination location has changed from a destination location in an immediately preceding route guidance, a guidance route from the vehicle location to the changed destination location.

4. The in-vehicle apparatus according to claim 2, wherein the processing data in the content-playback operation mode includes playback-position information of content, and the content-playback means resumes playback of the content from a playback position specified by the playback-position information.

* * * * *